(12) United States Patent
Rodriguez (10) Patent No.: US 8,584,719 B2
(45) Date of Patent: Nov. 19, 2013

(54) COVER FOR PROTECTION OF MOTOR VEHICLE DOOR EXTERIOR

(76) Inventor: Antolin Rodriguez, East Hartford, CT (US)

( * ) Notice: Subject to any disclaimer, the term of this patent is extended or adjusted under 35 U.S.C. 154(b) by 388 days.

(21) Appl. No.: 12/924,851

(22) Filed: Oct. 6, 2010

(65) Prior Publication Data

US 2011/0226394 A1 Sep. 22, 2011

Related U.S. Application Data

(60) Provisional application No. 61/340,414, filed on Mar. 17, 2010.

(51) Int. Cl.
*A45F 3/04* (2006.01)

(52) U.S. Cl.
USPC ...... 150/166; 150/154; 293/128; 296/136.07; 296/136.08; 296/136.1; 296/98; 160/370.21; 206/321; 206/372; 206/373

(58) Field of Classification Search
USPC .............. 150/154, 166; 293/128; 296/136.07, 296/136.08, 136.1
See application file for complete search history.

(56) References Cited

U.S. PATENT DOCUMENTS

| | | | | | |
|---|---|---|---|---|---|
| 4,041,999 | A | * | 8/1977 | Miller | 150/166 |
| 4,406,320 | A | * | 9/1983 | Bingham | 160/370.21 |
| 4,896,911 | A | * | 1/1990 | Duke | 293/128 |
| 5,845,958 | A | * | 12/1998 | Rudys et al. | 296/136.08 |
| 2004/0259447 | A1 | * | 12/2004 | Elkouh et al. | 442/121 |

* cited by examiner

*Primary Examiner* — Anthony Stashick
*Assistant Examiner* — Cynthia Collado
(74) *Attorney, Agent, or Firm* — Ira S. Dorman (57) ABSTRACT

A cover assembly for attachment to the doors of a motor vehicle, to protect their exterior surfaces, includes at least two cover panels that are adjustably affixed to one another to provide a subassembly of variable effective width. Upper and lower portions of the panels are disengageably attached to the door.

18 Claims, 5 Drawing Sheets

COVER FOR PROTECTION OF MOTOR VEHICLE DOOR EXTERIOR

CROSS-REFERENCE TO RELATED APPLICATION

This application claims the benefit of U.S. Provisional Patent Application No. 61/340,414, entitled "Auto Exterior Door Padding Cover Guard Scratch Preventor," filed Mar. 17, 2010.

BACKGROUND OF THE INVENTION

The doors of automobiles and other motor vehicles are constantly exposed to denting, scratching, marring and other damage, especially in public parking facilities. This is due largely to the carelessness of people in opening the doors of their adjacent vehicles, and to the failure to adequately control the movement of shopping carts, carriages, and the like. Exposure to impact is virtually inevitable in parking lots in which the spaces are of inadequate width, and the problem is exacerbated by the prevalence of large, oversized personal-use vehicles. Regrettably, it is also not uncommon for a vehicle surface to be scratched intentionally, as a simple act of mischief or vandalism.

As far as is known, no means is presently available for readily, conveniently, and adequately protecting the surfaces of vehicle door panels (i.e., the normally painted areas below a window or window frame) from accidental or intentional damage of the kinds described.

BRIEF SUMMARY OF THE INVENTION

Broad objects of the invention are to provide a cover assembly for attachment to a door of a motor vehicle to protect the door panel against marring, scratching, and other damage from minor impact, abrasion, and the like; and to provide a motor vehicle door so protected.

More specific objects of the invention are to provide such a cover assembly which is readily adjustable, to fit a range of door sizes; is capable of application to all doors of a motor vehicle, be it a two-door or a four-door model; is readily and conveniently attached and removed, while nevertheless resisting unauthorized removal; and which is of relatively incomplex and economical manufacture.

It has now been found that certain of the foregoing and related objects of the invention are attained by the provision of a cover assembly comprising first and second, generally rectangular cover panels of padding material, each having at least one height dimension, taken between upper and lower edges thereof, and at least one width dimension taken between opposite lateral edges thereof, the height of the panels being substantially the same; means for disengageably affixing the cover panels to one another with adjacent lateral marginal portions thereof overlapped so as to provide a substantially continuous protective cover subassembly; means for disengageably attaching, about structure of the protected vehicle door that extends upwardly of the door panel, upper portions of the assembled cover panels so as to dispose the protective cover subassembly over the exterior surface of the protected door panel with interior face portions of the panels lying thereagainst and with exterior face portions thereof exposed; and means for disengageably attaching lower portions of the assembled cover panels to lower portions of the protected vehicle door panel. The means for disengageably affixing the first and second cover panels to one another is constructed for varying the extent of overlap of the adjacent lateral marginal portions thereof so as to correspondingly vary the distance between their mutually remote, outer lateral edges and thereby vary the effective width of the protective cover subassembly.

In preferred embodiments of the invention the means for disengageably affixing the cover panels to one another will comprise a hook-and-loop type fastener arrangement, comprised of a loop component and a hook component interengagable with one another. A first one of the components of the fastener arrangement is provided on a lateral marginal portion of the first panel and on the normally exterior face thereof, and the other of the components of the arrangement is provided on the adjacent lateral marginal portion of the second panel and on the normally interior face thereof. The effective width of at least one of the components of the fastener arrangement is sufficient to enable effective interengagement of the components at a plurality of overlapping positions of the adjacent lateral marginal portions of said first and second cover panels.

More specifically, at least one of the components of the fastener arrangement will preferably have an effectively generally rectangular configuration, and will extend along substantially the entire height and along a substantial portion of the width, from adjacent an inner lateral edge, of the second panel. The cooperating component will desirably take the form of a first strip that extends along the inner lateral edge of the first panel and a second strip that extends, substantially from the first strip, along the upper edge of the panel toward the outer lateral edge thereof. The component of the fastener arrangement on the first panel will desirably be the hook component, and the component of the arrangement on the second panel will desirably be the loop component.

The means for attaching the upper portions of the assembled cover panels preferably comprises belt structure employed in combination with mounting elements on the cover panels, which elements will desirably define a multiplicity of mutually spaced passages through which at least a portion of the belt structure passes. The means for disengageably attaching the lower portions of the assembled cover panels will advantageously comprise at least one holding member attached to each of the cover panels and constructed to engage a corner portion at the bottom of the protected door panel. Each of such holding members may comprise a length of material affixed, at its opposite ends, at locations adjacent the lower edges of each cover panel, typically extending catercorner across a corner at the bottom. The first cover panel will most desirably have a second length of material affixed adjacent its lower edge, at a location intermediate its opposite lateral edges, and extending at an angle generally opposite to that at which the catercorner-extending length of material extends. The lengths of material employed as the holding members will advantageously be resiliently deformable, and may additionally include a pull or handle strip or tab, connected for facilitating disengagement of the holding member from the engaged corner portion of the protected door panel.

A plurality of permanent magnet pieces will advantageously be attached to each of the cover panels, at locations spaced inwardly from its periphery, for better securing the cover panels to the vehicle door. Such magnet pieces will either be effectively unexposed on the interior face portions of the cover panels, or will be fabricated or comprise a nonabrasive material or surface element.

Each of the cover panels will normally be comprised of at least two plys of material, the innermost ply being non-abrasive and relatively soft, for contacting the exterior surface of a protected door panel without causing scratching or marring, and the outermost ply being relatively tough, for affording strong mechanical protection, and water-resistance. A third ply of material will advantageously be disposed between the innermost and outermost plys, the intermediate ply having cushioning properties for increasing the ability of the cover subassembly to provide protection against impact. In most instances an opening will be formed through a corner portion of the first cover panel of the cover subassembly, located near the upper and outer lateral edges thereof so as to enable ready access at least to the handle of a protected vehicle door.

Other objects of the invention are attained by the provision of a motor vehicle provided with door-surface protection, comprised of a motor vehicle having at least one door comprising a door panel and structure that extends upwardly thereof; and a cover assembly having the structure and features hereinabove and hereinafter described. Upper and lower portions of the assembled cover panels are disengageably attached about the upwardly extending structure of the vehicle door and to lower portions of the vehicle door panel, respectively, so as to dispose the protective cover subassembly over the exterior surface of the door panel, for substantially its full width, with interior face portions of the cover panels lying thereagainst and with exterior face portions thereof exposed.

DETAILED DESCRIPTION OF THE INVENTION

Figure 1:
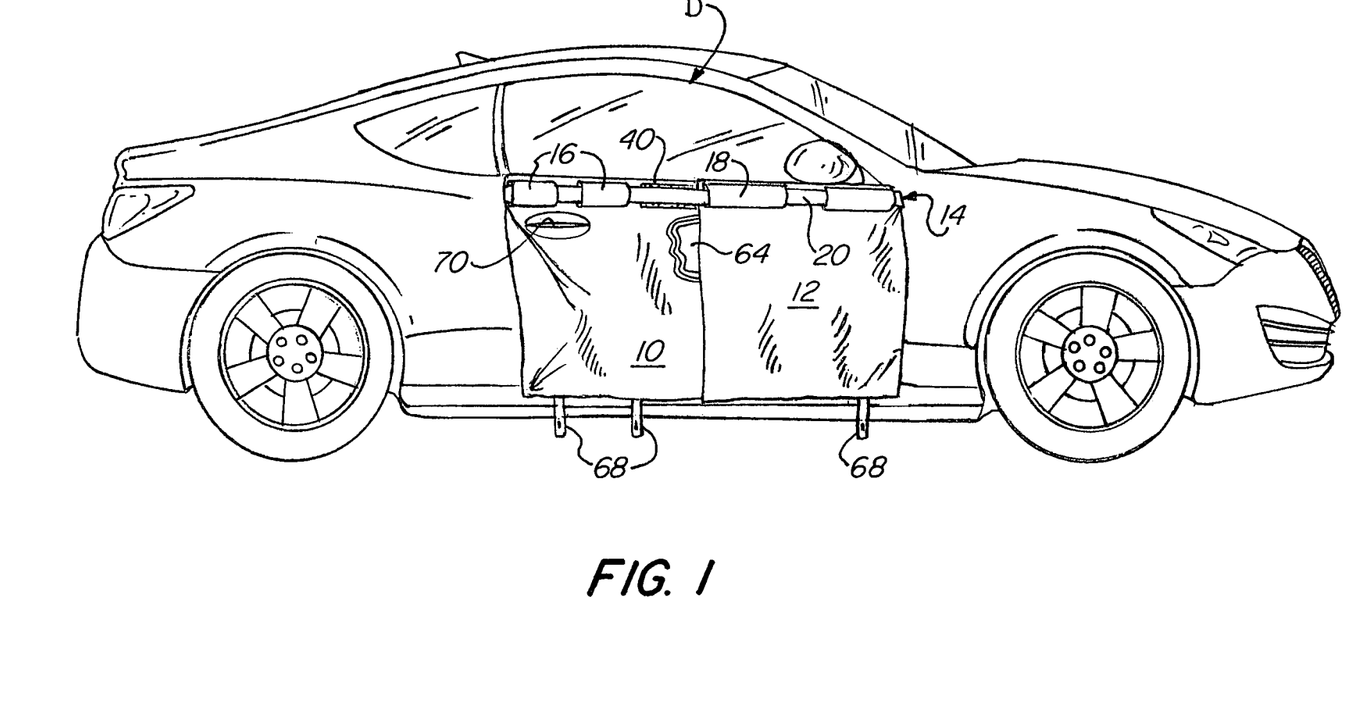
FIG. 1 is a side elevational view of an automobile to one door of which a cover assembly embodying the present invention has been attached.
Figure 4:
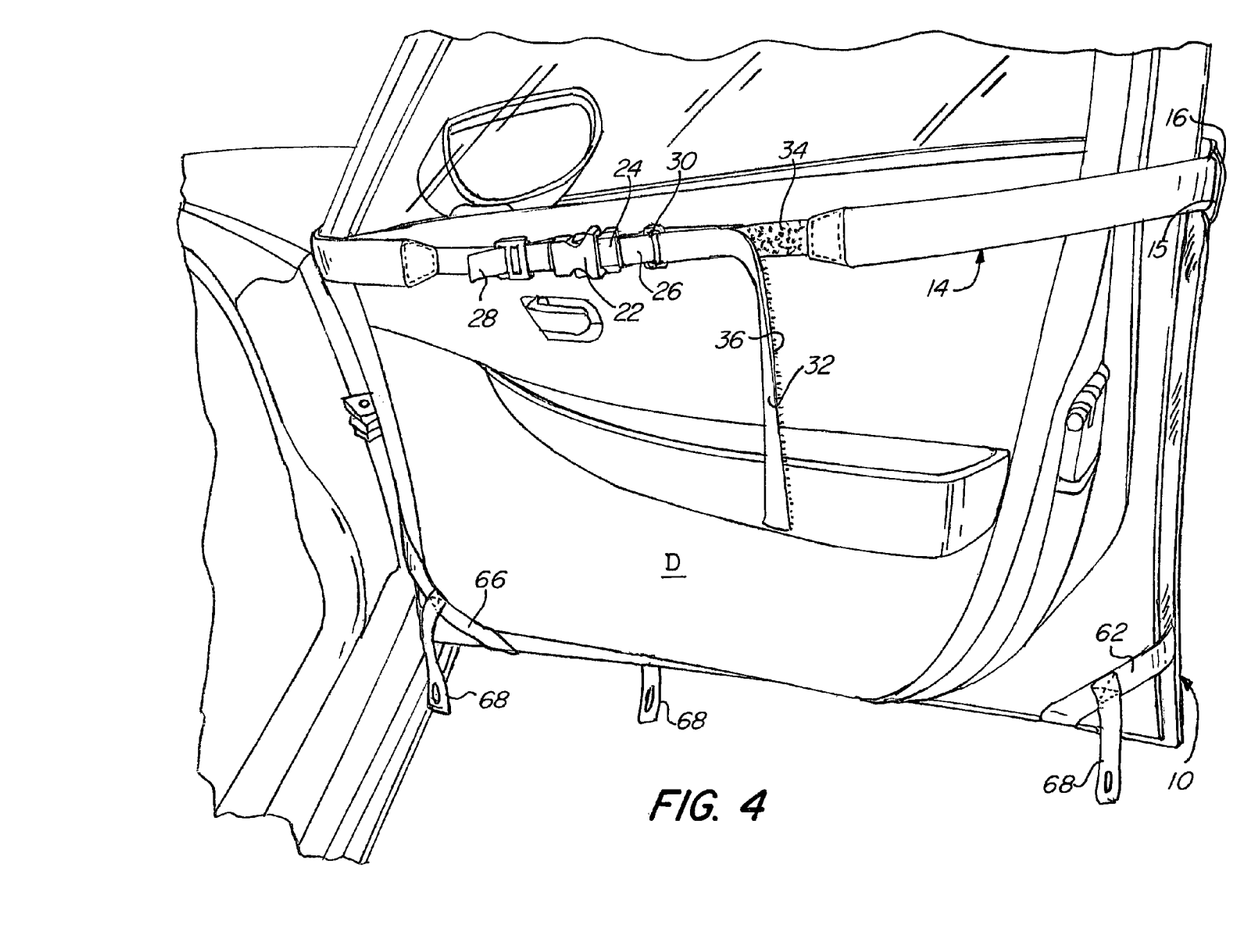
FIG. 4 is a fragmentary perspective view showing the inside of the open, protected door of the automobile of FIG. 1.

Turning now to the appended drawings, therein illustrated is a cover assembly embodying the present invention, shown in FIGS. 1 and 4, installed on the passenger-side door of a two-door automobile. Although not depicted, it will be appreciated that the cover assembly of the invention may be constructed to enable application to each door of a two-door or a four-door automobile. It may also be constructed to enable installation on motor vehicles other than automobiles, such as vans, SUVs, various models of trucks, etc.

Figure 2:
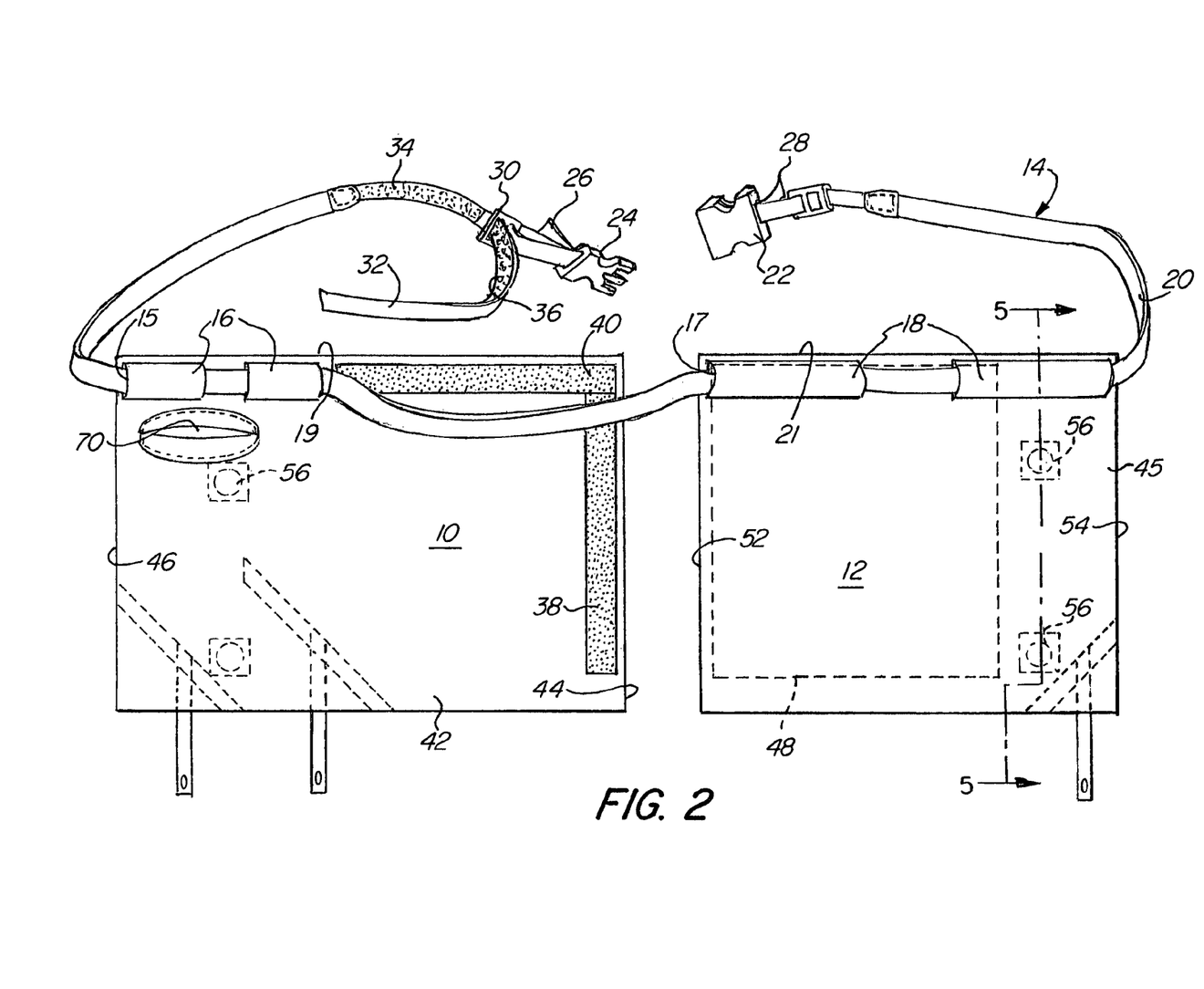
FIG. 2 is a side elevational view of a cover assembly embodying the present invention, drawn to a scale enlarged from that of FIG. 1 and depicting the exterior of the cover panels of padding material comprising the protective cover subassembly, disengaged and spaced laterally from one another.
Figure 3:
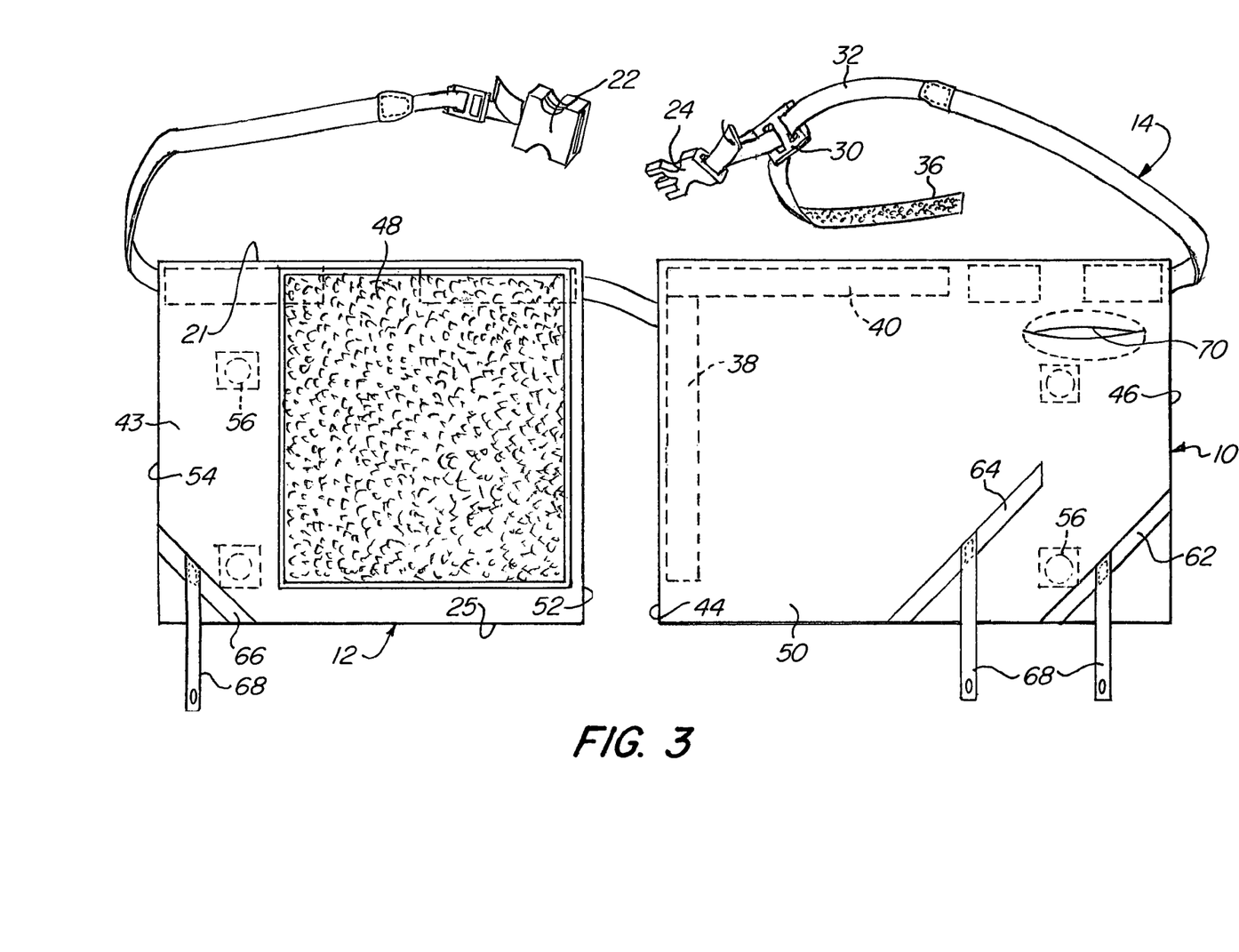
FIG. 3 is a view similar to that of FIG. 2 but showing the interior of the cover panels.
Figure 5:
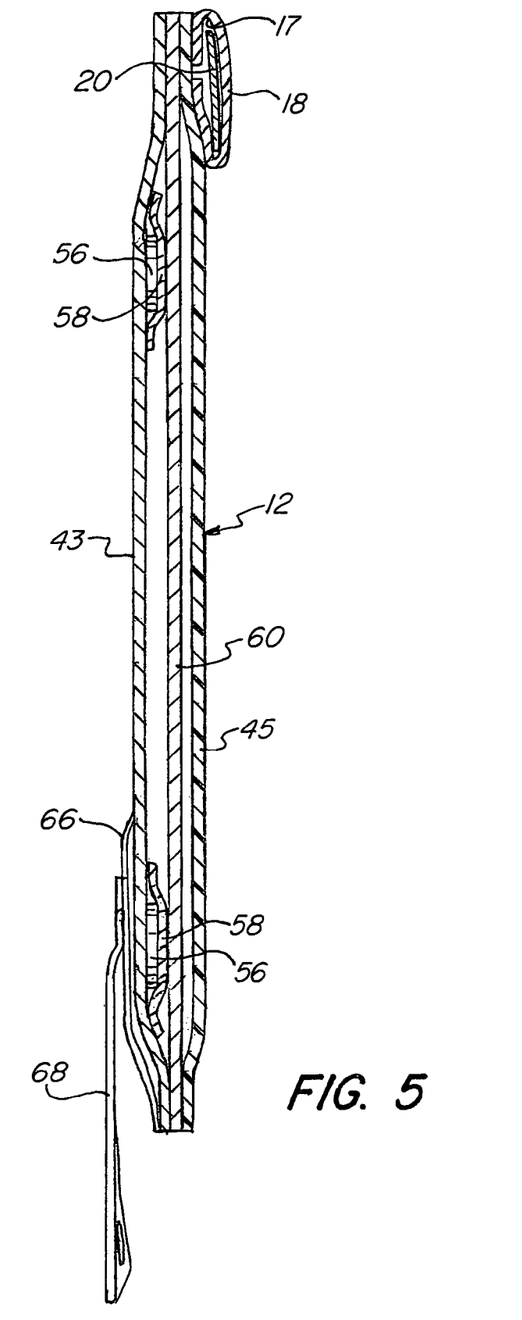
FIG. 5 is a sectional view, taken along line 5-5 in FIG. 2 and drawn to an enlarged scale.

As is best seen in FIGS. 2, 3, and 5 of the drawings, the cover assembly of the invention consists (in this illustrated embodiment) of two cover panels, generally designated respectively by the numerals 10 and 12, and a securing strap, generally designated by the numeral 14. Two sleeve-like pieces 16, 18 are attached adjacent the upper edges 19, 21 of the cover panels 10, 12, respectively, and define passages 15, 17 through which the belt component 20 (fabricated, for example, from a webbed material) passes, the sleeve pieces 16 and 18 being mutually spaced so as to facilitate threading of the strap therethrough; it will be appreciated that the belt 20 is freely movable within the passages 15, 17, and that it will typically also be of woven, web-like form. The female and male components 22, 24, of a so-called "parachute" buckle are secured by suitable elements 26, 28 to the opposite ends of the belt 20, and are constructed for secure, but readily releasable, interengagement in telescopic, snap-fit relationship. The element 26 is received through one of two parallel slots (unnumbered) of a coupling piece 30, with an end portion 32 of the belt 20 being received through the other slot. Strips 34, 36 of the cooperating, interengageable components of a conventional hook-and-loop type fastener arrangement (hereinafter referred to for convenience as Velcro) are attached to adjacent sections on the inside of the end portion 32 so as to permit ready adjustment of the effective length of the strap 14, thereby enabling it to most effectively serve its intended function (as will be described below).

As is best seen in FIG. 2, two strips 38, 40 of the same Velcro component (normally, the hook component) are affixed on the exterior surface 42 of the larger panel 10, with the strip 40 extending along the upper edge 19, from adjacent its inner lateral edge 44 toward its outer lateral edge 46, and with the strip 38 extending downwardly therefrom along the inner lateral edge 44.

Correspondingly, and as is best seen in FIG. 3, a rectangular piece 48 of the cooperating Velcro component (i.e., normally the loop component) is affixed over a substantial area on the face of the inner ply of the smaller panel 12. It extends from adjacent the upper edge 21 of the panel 12 almost to its lower edge 25, and from adjacent its inner lateral edge 52 most of the distance to the outer lateral edge 54.

As will be appreciated, the described arrangement of Velcro components 38, 40, 48 enables selective securement of the cover panels 10, 12 to one another with a very substantial range of variation of overlap, such that the distance between the respective outer lateral edges 46, 54, and hence the widthwise expanse of the resultant subassembly, can correspondingly be varied quite extensively. This in turn contributes to the universality of the assembly, enabling a single assembly to be utilized for a range of vehicle doors of different widths.

In addition to the features already described, each of the cover panels 10, 12 has a pair of magnets 56 embedded within its thickness at locations spaced inwardly from the periphery of the panel, as is best seen in FIG. 5. Each magnet 56 is secured in position by a patch 58, affixed to the inner surface of the innermost ply of material 50. Needless to say, the magnets serve to increase the security of attachment of the cover panel to the door panel (assuming of course the door panel is made of a ferric metal), and also to increase the aesthetics of the applied cover panels by minimizing sagging and distortion. Although solid or sintered metal magnets will normally be employed, it is possible that magnetic pieces having nonabrasive surfaces might be exposed directly on the interior of the cover panel without concern for scratching or marring of the door surface. Annular magnet pieces will typically be employed, but it will be appreciated that the particular shape of the magnetic element will generally be insignificant.

As is also seen in FIG. 5, the cover panels employed in the assembly of the invention will advantageously comprise an intermediate ply 60, in addition to the inner and outer plys 50, 45. The inner ply 50 will normally be a non-abrasive and relatively soft material (e.g., a woven or nonwoven natural or synthetic fleece), whereas the outer ply 45 will normally be of a tough and water-repellent material, such as nylon (in woven or sheet form). The intermediate ply 60 will generally be provided to add bulk and cushioning to the cover panel, and consequently will be selected to afford those properties; it may be of a natural or synthetic material, woven, nonwoven, cellular, etc.

As is best seen in FIG. 3, diagonal straps 62 and 64 on panel 10, and 66 on panel 12, are secured against the surfaces of the inner plys 50, 43, respectively, and serve to engage corner portions of vehicle door panels on which the cover assembly is mounted. The strips 62, 64, 66 extend (in the illustrated embodiment) catercorner across the door corner portions when properly mounted thereupon, and they will desirably of an elastic material so as to facilitate engagement and to maintain tension. Disengagement is facilitated by the provision of handle or pull straps or tabs 68, one of which is attached intermediate the ends of each strip 62, 64, 66.

It will be appreciated that the lengths of the strips 62, 64, 66 may vary from one another, and will be selected so as to enable each to best serve its intended function. For example, because the rear door of a four-door automobile will usually be formed with a large radius arcuate indentation, so as to follow the structure defining the wheel well, the strip used to secure the attached portion of the cover panel (e.g., strip 64 on panel 10) may desirably be longer than the other two.

Finally, it will be noted that the panel 10 is formed with a reinforced opening at 70. This serves of course to enable access to the handle of the vehicle door, and may take any of wide variety of forms. The same opening may serve to provide access to either a key-operated lock or an electronic keypad.

As indicated above, a cover assembly embodying the invention is depicted in FIG. 1 as applied to an automobile door "D", the surface 64 of which is visible through the cut-away section in the panel 10. FIG. 4 depicts the inside of the automobile door D as it might appear with the cover assembly attached and secured. As can be seen, the strap 14 encircles the structure of the door at or adjacently above the protected panel, with its end portions secured by engagement of the cooperating components 22, 24 of the parachute buckle. Needless to say, after the buckle components have been interengaged the strap 14 can be tightened by pulling the end portion 32 of the belt 20 through the coupling piece 30, and then engaging the Velcro components 34, 36 at the established level of tightness. Removal of the cover assembly simply requires release of the buckle components from one another, and displacement of the elastic strips 62, 66 from the engaged corner portions of the door, conveniently utilizing the pull tabs 68 for that purpose. Due to the width of the particular door D illustrated, it will be appreciated that only the outermost strips 62, 66 are functional in attaching the cover assembly, with the interior strip 64 being free of securement.

It will also be appreciated that after the door has been closed the buckle on the strap 14, and the strips 62, 66 and attached straps 68, will be located within the vehicle chamber. Unauthorized removal will thereby be deterred.

While, as mentioned above, each cover assembly may be employed for doors of a variety of dimensions and configurations, as a practical matter sets of the panels will desirably be manufactured in a range of sizes, specifically adapted for particular makes and models of vehicles. Moreover, it will be appreciated that two sets of assemblies will usually be needed (i.e., one for the passenger's side and a second, of mirror image form, for the driver's side), but it is within the scope of the present concept to construct a single assembly that can be applied to the doors on both sides of a vehicle.

By way of specific example, a cover assembly adopted for protection of the door panels of a four-door HONDA ACCORD utilizes a larger cover panel (e.g., panel 10) that measures about 30 inches wide (i.e., between its lateral edges) and a smaller cover panel (e.g., panel 12) that measures about 22 inches wide, both panels being 33 inches high (i.e., between their upper and lower edges). The fabric sleeve elements 16, 18 are about 10 inches long (albeit shown in the figures to be of different lengths) and, on each panel, and they are separated from one another by about two inches; the passages they define are about three inches across. The elastic diagonal strips adjacent the outer lateral edges of the panels are both about 10 inches long and one inch wide; the second strip (intermediate the lateral edges of the panel) is, for the reason described above, about 15 inches long; the pull straps are also about 10 inches long.

The two Velcro strips on the larger panel are each about two inches wide, with the strips along the upper and lateral edges being about 16 and 28 inches long, respectively. The rectangular Velcro piece provided on the smaller cover panel measures about 30 inches high and 18 inches wide. As a result, the subassembly of the two cover panels will, in this example, have a total effective expanse (measured between the remote lateral edges) ranging from about 36 to about 52 inches.

The embedded annular magnet pieces are typically 2⅞ inches in diameter and are capable of generating a holding force of about six pounds each. The door handle opening is typically located about 10 inches below the upper edge of the cover panel and extends over a distance of perhaps eight inches, starting at a point about four inches away from the adjacent lateral edge. The length of the strap that runs along the upper edge of the cover subassembly is about ten feet, adjustable to enable securement of the assembly throughout the full range of its expanse.

Apart from dimensional specifications, it will be appreciated that a wide range of variations may be made in the cover assembly of the invention without departure from the scope of the present claims. Suitable materials of construction will be obvious to those skilled in the art, taking into account the foregoing description and the functional purposes that have been expressed and/or that would be apparent. Clearly, while a hook-and-loop fastener arrangement will be optimal in most instances (due to the physical and functional flexibility and variation that it affords), other suitable fastener means may be employed, such as zippers, hooks and eyes, snap fasteners, and the like. Obviously, however, if any of these alternative mechanical fasteners are employed multiple elements (running in a plurality of mutually spaced columns extending between the upper and lower edges, or arranged over an area as an array) will be required to afford adjustability of the overall width of the subassembly. Furthermore, while the subassembly will preferably consist of only two cover panels, it will be appreciated that three or more such panels, having any suitable means for varying the effective width of the subassembly, may be employed. The means used for attaching the cover panels to the vehicle door can also vary widely, the encircling strap and diagonal bottom strips described herein being only exemplary, albeit preferred.

Thus, it can be seen that the present invention provides a cover assembly for attachment to a door of a motor vehicle to protect its panel against marring, scratching and other damage from minor impact, abrasion, and the like; and it provides a motor vehicle door so protected. The cover assembly is readily adjustable to fit a range of door sizes; it is capable of application to all doors of a motor vehicle, be it a two-door or a four-door model; it is readily and conveniently attached and removed, while nevertheless resisting unauthorized removal; and it is of relatively incomplex and economical manufacture.

Having thus described the invention, what is claimed is:

1. A cover assembly for attachment to a door of a motor vehicle to protect an exterior surface of its panel, said cover assembly comprising: first and second, generally rectangular cover panels of padding material, each of said cover panels having at least one height dimension, taken between upper and lower edges thereof, and at least one width dimension taken between opposite lateral edges thereof, the at least one height dimension of said first cover panel and of said second cover panel having substantially the same value; means for disengageably affixing said first and second cover panels to one another with adjacent lateral marginal portions thereof overlapped so as to provide a substantially continuous protective cover subassembly; means for disengageably attaching, about structure of the protected vehicle door that extends upwardly from and beyond the door panel, upper portions of said assembled cover panels so as to dispose said protective cover sub-assembly over the exterior surface of the protected door panel with interior face portions of said cover panels lying thereagainst and with exterior face portions thereof exposed; and means for disengageably attaching lower portions of said assembled cover panels, so disposed, to lower portions of the protected vehicle door panel; said means for disengageably affixing said first and second cover panels to one another being constructed for varying the extent of overlap of said adjacent lateral marginal portions of said cover panels so as to correspondingly vary the distance between the mutually remote, outer lateral edges thereof and thereby vary the effective width of said protective cover subassembly, and said means for disengageably affixing comprising a hook-and-loop type fastener arrangement comprised of a loop component and a hook component interengagable therewith, a first one of said components of said fastener arrangement being provided on at least said lateral marginal portion of said first panel and on the normally exterior face thereof, and the other of said components of said arrangement being provided on at least said lateral marginal portion of said second panel and on the normally interior face thereof, said second panel having a surface area defined by the height and width thereof, a majority of said surface area being effectively covered by said other of said components of said fastener arrangement, extending from adjacent an inner lateral edge of said second panel, to enable effective interengagement of said components of said fastener arrangement selectively at a plurality of overlapping positions of said adjacent lateral marginal portions of said first and second cover panels.

2. The assembly of claim 1 wherein an opening is formed through a corner portion of said first cover panel, near said upper edge and said outer lateral edge thereof, to enable ready access at least to the handle of a protected vehicle door.

3. The assembly of claim 1 wherein said component of said fastener arrangement on said first panel is said hook component and said component of said arrangement on said second panel is said loop component.

4. The assembly of claim 1 wherein said first one of said components is in the form of a first strip that extends along the inner lateral edge of said first panel and a second strip that extends, substantially from said first strip, along said upper edge of said first panel toward said outer lateral edge thereof.

5. The assembly of claim 4 wherein said first one of said components is said hook component.

6. The assembly of claim 1 wherein said means for attaching said upper portions of said assembled cover panels comprises belt structure and elements on said cover panels for mounting said belt structure.

7. The assembly of claim 6 wherein said elements for mounting said belt structure define a multiplicity of mutually spaced passages through which at least a portion of said belt structure passes.

8. The assembly of claim 1 wherein said means for disengageably attaching said lower portions of said assembled cover panels comprises at least one holding member attached to each of said cover panels and constructed to engage a corner portion at the bottom of the protected door panel.

9. The assembly of claim 8 wherein said at least one holding member comprises a length of material affixed, at opposite ends, at a location adjacent said lower edge of each of said cover panels.

10. The assembly of claim 9 wherein said length of material extends catercorner across a corner at the bottom of said each cover panel.

11. The assembly of claim 10 wherein said first cover panel has a second said length of material affixed adjacent said lower edge, at a location intermediate said opposite lateral edges thereof and extending at an angle generally opposite to that at which said catercorner-extending length of material extends.

12. The assembly of claim 9 wherein said length of material is resiliently deformable.

13. The assembly of claim 12 wherein said means for disengageably attaching said lower portions additionally includes a pull strip connected to said length of material for facilitating its disengagement from the engaged corner portion of the protected door panel.

14. The cover assembly of claim 1 additionally including a plurality of permanent magnet pieces attached to each of said cover panels, said magnet pieces being disposed at locations spaced inwardly from the periphery of said each cover piece and being effectively unexposed on said interior face portions of said cover panels, or fabricated to avoid marring or scratching of the panel surface.

15. The cover assembly of claim 1 wherein each of said cover panels is comprised of at least two plies of material.

16. The cover assembly of claim 15 wherein an innermost ply of material comprising said each cover panel is non-abrasive and relatively soft, for contacting the exterior surface of a protected door panel without causing scratching or marring, and wherein an outermost ply of material said each cover panel is relatively tough, for affording strong mechanical protection, and water-resistant.

17. The cover assembly of claim 16 additionally including a third ply of material disposed between said innermost ply and said outermost ply, said third ply of material having cushioning properties for increasing the ability of said cover subassembly to provide protection against impact.

18. A motor vehicle having door-surface protection, comprised of:
a motor vehicle having at least one door comprising a door panel and structure that extends upwardly therefrom and therebeyond; and
a cover assembly attached to said door for protecting an exterior surface of said door panel, said cover assembly comprising: first and second, generally rectangular cover panels of padding material, each of said cover panels having at least one height dimension, taken between upper and lower edges thereof, and at least one width dimension taken between opposite lateral edges thereof, the at least one height dimension of said first cover panel and of said second cover panel having substantially the same value; means for disengageably affixing said first and second cover panels to one another with adjacent lateral marginal portions thereof overlapped so as to provide a substantially continuous protective cover subassembly for said door panel, and said cover panels being so affixed to one another by said means for disengageably affixing; means for disengageably attaching, about said upwardly extending structure of said vehicle door, upper portions of said assembled cover panels so as to dispose said protective cover subassembly over said exterior surface of said door panel with interior face portions of said cover panels lying thereagainst and with exterior face portions thereof exposed, said upper portions of said assembled cover panels being so attached by said means for disengageably attaching upper portions; and means for disengageably attaching lower portions of said assembled cover panels, so disposed, to lower portions of said vehicle door panel, said lower portions of said assembled cover panels being so attached by said means for disengageably attaching lower portions; said means for disengageably affixing said first and second cover panels to one another being constructed for varying the extent of overlap of said adjacent lateral marginal portions of said cover panels to correspondingly vary the distance between the mutually remote, outer lateral edges thereof, thereby to vary the effective width of said protective cover subassembly so as to cause said subassembly to cover substantially the full width of said vehicle door panel, and said means for disengageably affixing comprising a hook-and-loop type fastener arrangement comprised of a loop component and a hook component interengagable therewith, a first one of said components of said fastener arrangement being provided on at least said lateral marginal portion of said first panel and on the normally exterior face thereof, and the other of said components of said arrangement being provided on at least said lateral marginal portion of said second panel and on the normally interior face thereof, said second panel having a surface area defined by the height and width thereof, a majority of said surface area being effectively covered by said other of said components of said fastener arrangement, extending from adjacent an inner lateral edge of said second panel, to enable effective interengagement of said components selectively at a plurality of overlapping positions of said adjacent lateral marginal portions of said first and second cover panels.

* * * * *